3 Sheets—Sheet 1.

O. C. WHITE & A. T. ASHMEAD.

Assignors to S. S. WHITE.

Dentist's Chair.

No. 8,380. Reissued Aug. 20, 1878.

WITNESSES

Wm A Skinkle

Geo W Breck

INVENTORS

Otis C White

Austin T Ashmead

By their Attorneys

Baldwin Hopkins & Peyton

O. C. WHITE & A. T. ASHMEAD.

Assignors to S. S. WHITE.

Dentist's Chair.

No. 8,380. Reissued Aug. 20, 1878.

WITNESSES

Wm A Skinkle

Geo W Breck.

INVENTORS

Otis. C. White.

Austin. T. Ashmead.

By their Attorneys.

Baldwin, Hopkins & Peyton

3 Sheets—Sheet 3.

O. C. WHITE & A. T. ASHMEAD.

Assignors to S. S. WHITE.

Dentist's Chair.

No. 8,380. Reissued Aug. 20, 1878.

WITNESSES

Wm A Skinkle

Geo W Breck

INVENTORS

Otis C White.

Austin T Ashmead.

By their Attorneys.

Baldwin, Hopkins & Peyton

UNITED STATES PATENT OFFICE.

OTIS C. WHITE, OF HOPKINTON, MASSACHUSETTS, AND AUSTIN T. ASHMEAD, OF HARTFORD, CONNECTICUT, ASSIGNORS TO SAMUEL S. WHITE, OF PHILADELPHIA, PENNSYLVANIA.

IMPROVEMENT IN DENTISTS' CHAIRS.

Specification forming part of Letters Patent No. 82,776, dated October 6, 1868; Reissue No. 8,380, dated August 20, 1878; application filed May 31, 1878.

*To all whom it may concern:*

Be it known that we, OTIS C. WHITE, of Hopkinton, in the county of Middlesex and State of Massachusetts, and AUSTIN T. ASHMEAD, of the city and county of Hartford, and State of Connecticut, have invented an Improved Chair for the Use of Dentists, of which the following is a specification:

Our invention relates to dentists' chairs of that class having a fixed or non-rotating base, a supporting column or spindle movable endwise by racks or equivalent means in said base, but incapable of turning axially in said base, and a chair-body mounted upon the column and capable of being turned relatively to the column and base, as well as of varying its horizontal inclination.

The objects of our invention are to increase the efficiency, simplify the construction, and diminish the cost of such chairs, and to support the chair firmly upon its base, while rendering it capable of ready adjustment in various directions.

The invention consists of certain new combinations of a chair-body with devices none of which are new when considered by themselves, but which, when combined as hereinafter described, produce certain new combinations, which are set forth at the close of the specification.

The subject-matter claimed will hereinafter specifically be designated.

Figure 1:
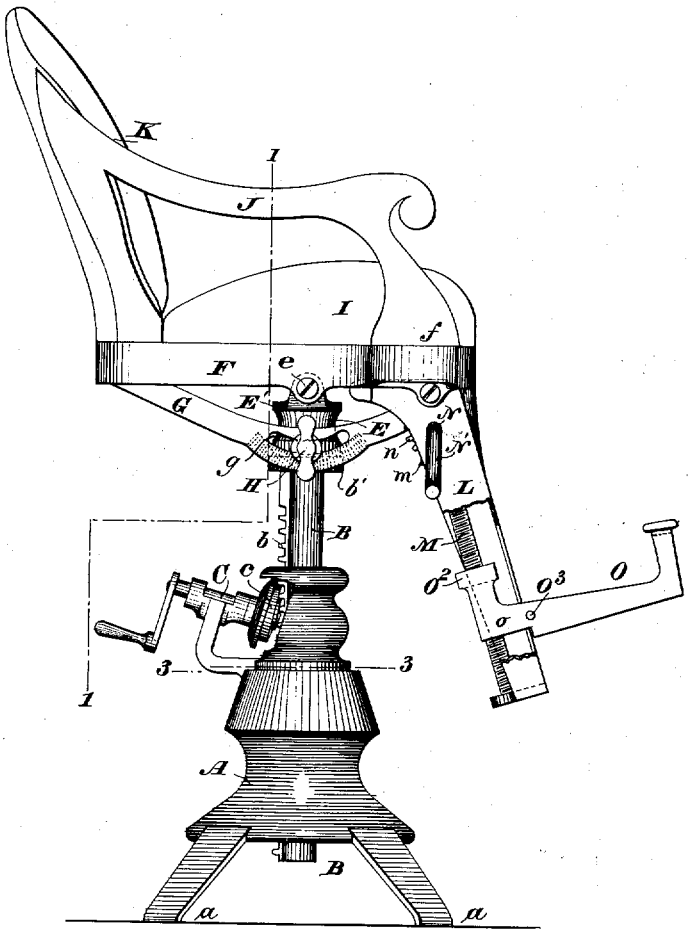
Figure 2:
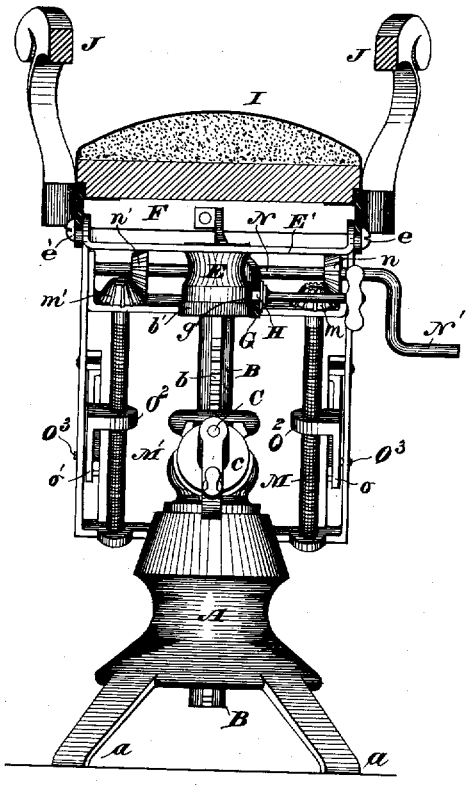
Figure 3:
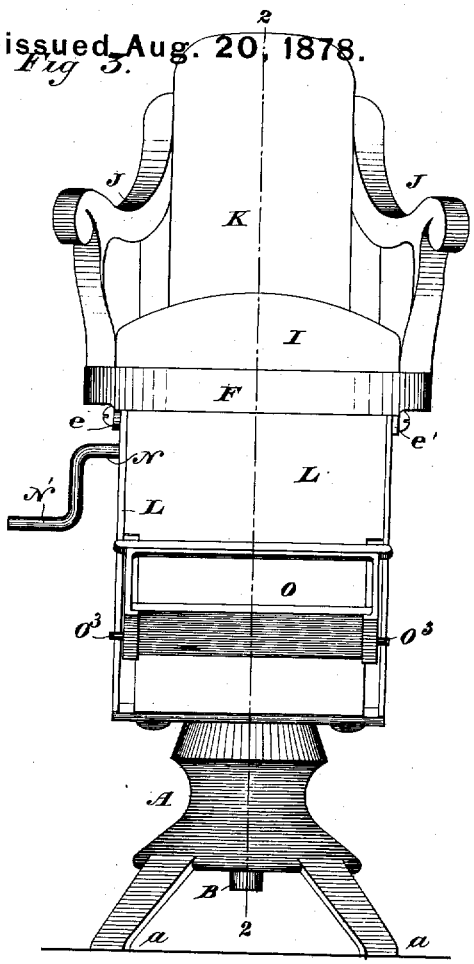
Figure 5:
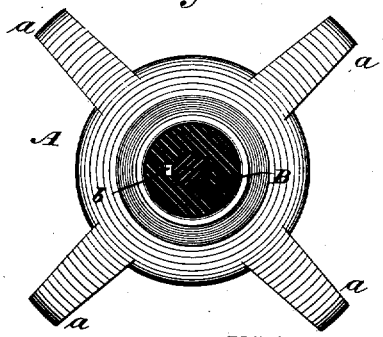
Figure 4:
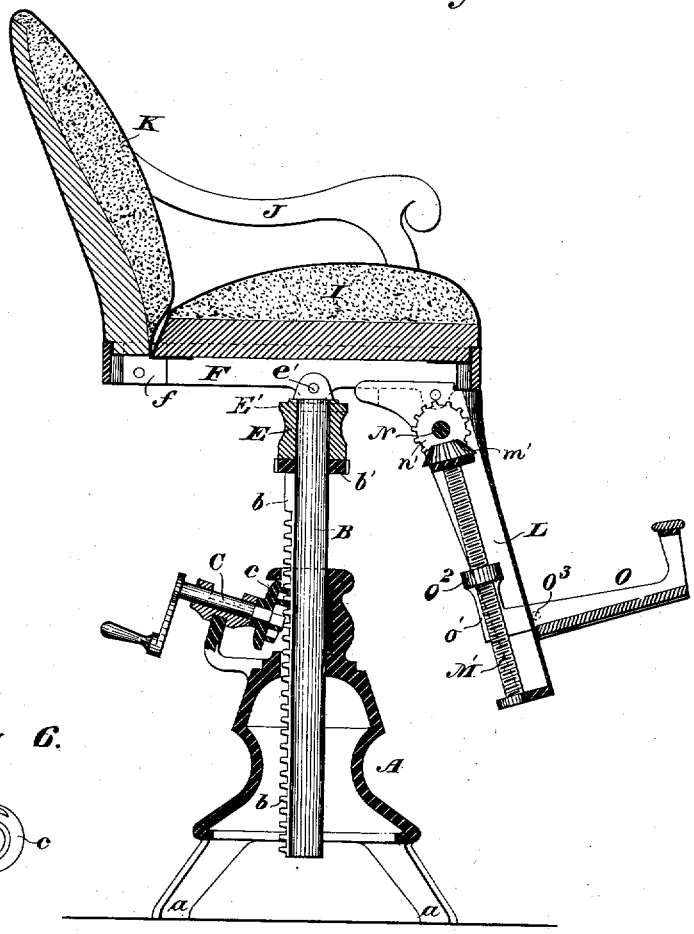
Figure 6:
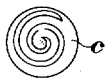

In the accompanying drawings, Figure 1 represents a side elevation of our improved chair; Fig. 2, a rear elevation thereof, partly in section, on the line 1 1 of Fig. 1; Fig. 3, a front elevation thereof; Fig. 4, a vertical longitudinal section therethrough on the line 2 2 of Fig. 3; Fig. 5, a horizontal section through the base on the line 3 3 of Fig. 1; Fig. 6, a face view of the scroll-cam; and Fig. 7, an inverted plan view of the seat-frame, with a portion broken away to show its construction more clearly.

A hollow base or foot-stand, A, is shown as supported upon feet *a*. An upright supporting post, spindle, or column, B, moves freely endwise through a socket in the base, but is prevented from turning therein by a rack, *b*, the teeth of which project from the supporting-column into a groove in the base, and is also prevented from tipping laterally of said base by reason of sliding in the socket or bore thereof.

A scroll-cam, *c*, mounted upon a shaft, C, turning in suitable bearings in the base, and operated by a crank, engages with the rack *b*.

The scroll-cam and rack constitute means for raising or lowering the supporting spindle or column. The cam and rack also retain the supporting-column in any desired position to which it may be raised or lowered. This supporting-column is connected with and supports the chair-body, consisting of the seat-frame, back-frame, and arms.

A flange or collar, *b'*, is fixed upon the spindle near its upper end. A cross-bar or yoke, E', is provided with a central boss or hub, E, which fits snugly and turns upon the upper end of the supporting spindle or column B, and intervenes between it and the chair-body, so that the latter is permitted by the hub to turn relatively to the column without tipping relatively thereto. The outer ends of this bar or yoke are turned upward and pivoted at *e e'* to the seat-frame F of the chair-body, near its center, in order to enable the chair-body to be tipped forward and rearward upon its pivots without moving the chair-body materially forward and backward relatively to its supporting-column.

A curved bar, G, projects downward from the seat-frame, and bears slightly against the fixed flange or collar *b'* above mentioned, the inner side of the bar being serrated correspondently with the milled edge of the flange, for a purpose hereinafter described. The curved bar G is provided with a slot, *g*, curved in the arc of a circle, of which the pivot *e* (on which the chair-body rocks) forms the center. A clamp-screw, H, goes through the slot and screws into the hub or boss E, so as to enable the bar G to be forced laterally against the periphery of the collar. By this means the milled edge of the collar is forced in contact with the teeth on the bar G, and the two are clamped firmly together, thus preventing the chair-body from turning on its spindle, and also locking it in any position to which it may be tipped.

The clamp-screw surface of the collar and surface of the bar G thus constitute means for locking the chair-body in any position to which the chair-body may be turned horizontally, and they also constitute means for locking the chair-body in any position to which it may be tipped upon the pivots of the cross-bar or yoke.

Figure 7:
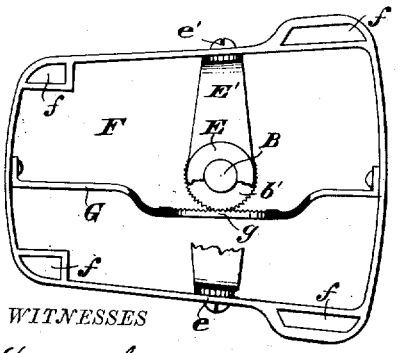

The seat I, arms J, and back K of the chair are shown as supported upon a metallic seat-frame, F, formed as represented in Fig. 7, it being provided with mortises *f* at its corners to receive the posts of the arms and back.

Another frame, L, extending obliquely downward and forward from the front of the seat-frame F, serves to support parallel screws M M′ near the outer edges of the frame. The upper ends of these screws carry bevel-gears *m m′*, respectively engaged with corresponding bevel-gears *n n′* on a horizontal shaft, N, mounted in the frame L and provided with a crank, N′, for turning it.

A foot-rest or platform, O, is provided with arms $o$ $o^1$, extending through slots in the frame L, and having internally-threaded brackets $o^2$ on their inner ends, through which the screws M M′ work. Studs $o^3$ on these arms bear against the frame L. In this way the foot-rest is supported to great advantage both by the screws M M′ and frame L. By turning the crank N′ the foot-rest may be raised or lowered as required.

From the above description it will be readily observed that the chair-body, including seat, back, and arms, is capable of being adjusted both vertically and horizontally, as well as inclined with great facility, and that the foot-rest is moved with the chair-body, and may also be adjusted relatively to the chair-seat. We are also enabled to clamp the chair-body at any angle desired and to prevent its rotation relatively to the base.

We do not broadly claim adjusting a chair vertically, horizontally, and at an inclination, as chairs possessing these functions are well known in the art; but

We claim as our invention and desire to secure by Letters Patent—

1. The combination of the stand or base, the feet which support it above the floor, the non-rotating supporting-spindle fitting snugly in, supported laterally by, and movable endwise through, said base, the turning hub, the cross-bar or yoke, and the chair-body connected with the cross-bar by pivots near each side of the chair, these members being constructed to operate in combination, substantially as hereinbefore set forth.

2. The combination of the chair-body, the cross-bar pivoted thereto at each end, the non-rotating supporting-column, and the base or stand mounted upon feet, through which stand the spindle or column moves freely endwise and is firmly supported laterally therein, these members being constructed to operate in combination, substantially as hereinbefore set forth.

3. The combination of the chair-body, the cross-bar pivoted thereto at each side, the non-rotating supporting spindle or column fitting snugly in, supported laterally by, and movable endwise through, the base, the stand or base and its supporting-feet, these members being constructed to operate in combination, substantially as hereinbefore set forth.

4. The chair-body adapted to tilt or oscillate upon the single cross-bar or yoke, in which it is pivoted near both sides, the said bar being mounted upon a vertically-moving non-rotating column, and provided with means for securing the said chair-body in its various positions.

5. The combination, substantially as hereinbefore set forth, of the base, the non-rotating seat-supporting column or spindle, the turning hub, the cross-bar or yoke turning relatively to the base, the chair-body pivoted on the bar near each side, and a clamp which locks the chair against rotation.

6. The combination, substantially as hereinbefore set forth, of the chair-body, the foot-rest supporting frame or platform, the elevating-screws, and the operating shaft and gearing to adjust the foot-rest.

OTIS C. WHITE.
A. T. ASHMEAD.

Witnesses:
ALFRED GIBBS,
C. MESERVE,
THOS. D. TOWLE,
JOHN B. CLAPP.